Nov. 9, 1954 H. W. SCHEELINE 2,693,865
FRACTIONATION OF HYDROCARBON GASES BY SOLID ADSORBENTS
Filed May 5, 1949
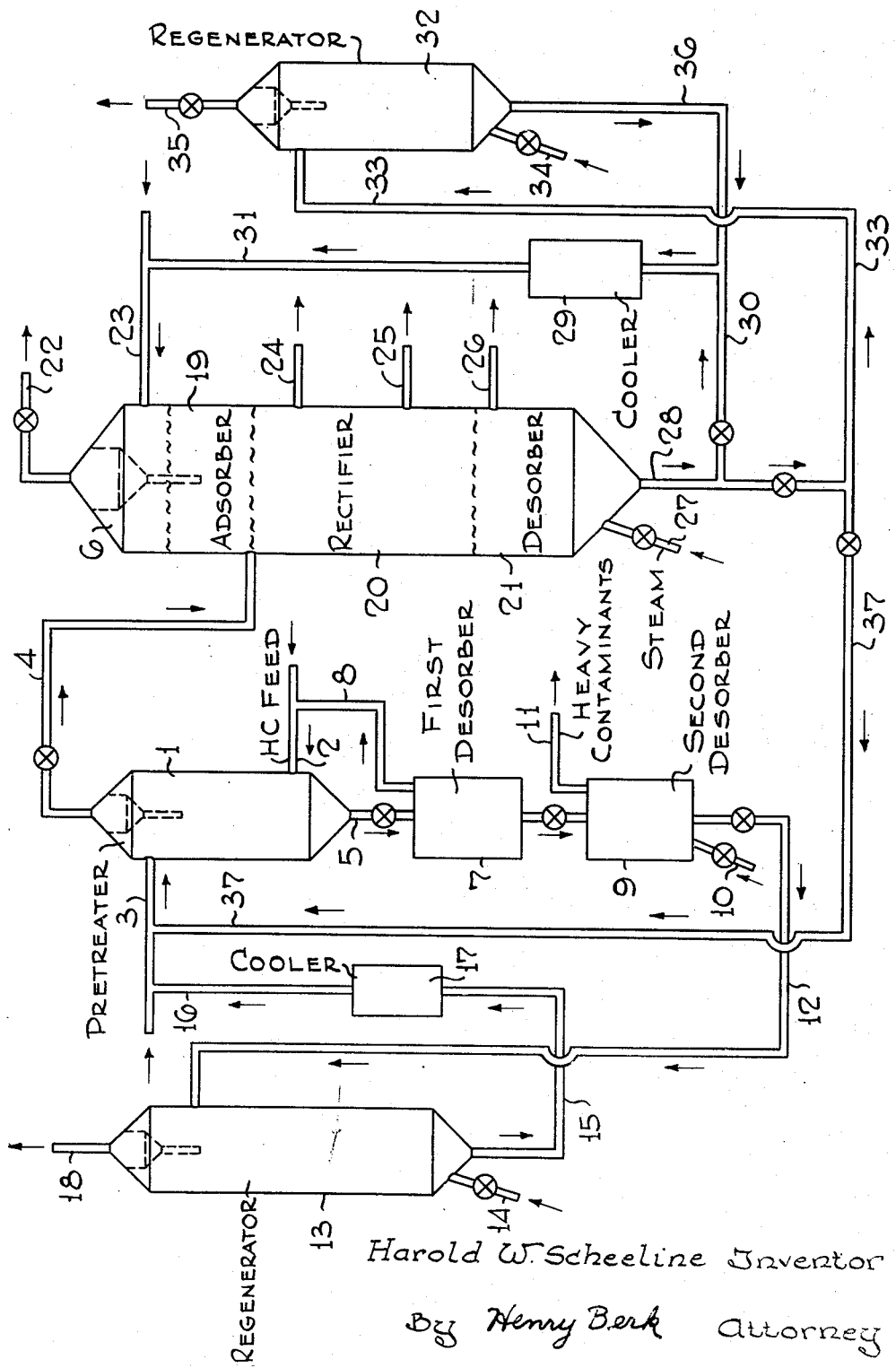
Harold W. Scheeline Inventor
By Henry Berk Attorney United States Patent Office 2,693,865
Patented Nov. 9, 1954

2,693,865

FRACTIONATION OF HYDROCARBON GASES BY SOLID ADSORBENTS

Harold W. Scheeline, East Orange, N. J., assignor to Standard Oil Development Company, a corporation of Delaware Application May 5, 1949, Serial No. 91,464

2 Claims. (Cl. 183—114.2)

This invention relates to the separation of hydrocarbon gases into their components according to molecular weight by means of fractionation with solid adsorbents particularly charcoal. The invention is particularly directed to the pretreatment of the hydrocarbon gas stream by removal of heavy and highly unsaturated constituents from the gas before treatment of the gas in the fractionation process.

In the separation of gases such as light hydrocarbon mixtures by the selective action of solid adsorbents such as activated charcoal difficulty is encountered due to the deactivation of the adsorbent by relatively small amounts of high molecular weight and/or highly unsaturated constituents, particularly diolefin hydrocarbons, such as styrene, vinyl acetylene, diacetylene, butadiene, isoprene, pentadiene, cyclopentadiene, etc., which are often present in gases produced by the cracking of hydrocarbons. Butadiene, pentadiene and cyclopentadiene are particularly troublesome from the standpoint of deactivation of the charcoal. These materials are normally strongly held by the adsorbent and often undergo chemical changes such as polymerization when in an adsorbed condition. Their removal from the adsorbent by any but the most drastic means is therefore quite difficult. If these materials are not removed from the adsorbent they render the adsorbent ineffective for adsorbing the lighter gaseous constituents such as ethylene, propylene, etc., which it is desired to recover.

Removal of high boiling impurities from the feed gas stream may be accomplished by such conventional means as oil scrubbing. However, in order to make such a step possible without the use of excessive amounts of absorption oil, it is necessary to carry out the scrubbing step at elevated pressures, usually from 100 to 200 p. s. i. g. As a result it is necessary to compress the entire hydrocarbon feed gas stream, a step involving considerable equipment and expense, and one which nullifies to a large extent one major advantage of using adsorptive technique for hydrocarbon separation, namely, that the separation can be carried out at low pressures, say 1 to 6 atmospheres absolute pressure. In addition oil scrubbing is not particularly suitable for complete removal of impurities which have volatilities greater than the $C_5$ hydrocarbons.

According to the terms of the present invention, the hydrocarbon gas, prior to the main adsorption-fractionation treatment with a solid adsorbent, is subjected to the action of a separate body of relatively inexpensive adsorbent, such as low grade charcoal or carbon, partially deactivated or spent charcoal, silica, alumina, clay or other suitable solids. The function of this material called a "guard adsorbent" is to remove traces of the objectionable constituents described above from the gas stream to the main adsorption chamber. This treatment is carried out in a pretreater or in a guard chamber. The pretreatment is carried out at a pressure of 1 to 6 atmospheres absolute, that is, at the same pressure employed in the hydrocarbon adsorption-fractionation. The guard adsorbent may be charcoal; however, a cheaper, more abundant type of charcoal could be employed if desired rather than the expensive activated charcoal which is employed in the main adsorption tower. Alternatively, the guard adsorbent may be a material chosen from the group consisting of deactivated or spent charcoal, silica gel, activated silica gel, alumina, pretreated alumina, silica-alumina, clay, activated clay and other noncombustible solids or mixtures of the same. A necessary characteristic of the guard adsorbent should be its ability to remove the objectionable impurities from the hydrocarbon gas stream. Desirable but not absolutely necessary characteristics include low cost and ability to withstand severe regeneration conditions. The pretreatment of the hydrocarbon gas with the guard adsorbent may take place in a stationary bed, moving bed or fluid solids process. The details of the equipment depend upon the technique employed.

In general the quantity of guard adsorbent used or circulated per unit of gas treated in the pretreatment step will be very much less than that employed in the subsequent gas fractionation steps. This is because of the small amount of material to be removed in the pretreatment step and the high capacity of the adsorbent for the material so removed. Because a relatively small amount of adsorbent is used, severe regeneration conditions may be employed to maintain proper activity of the adsorbent without excessive expense due to loss of the adsorbent during reactivation and without excessively large equipment for carrying out the reactivation.

The drawing represents in sectional elevation an outline of one form of process and apparatus for carrying out the invention.

The numeral 1 represents a pretreating or guard chamber to which is fed the guard adsorbent via line 3 and the hydrocarbon feed such as refinery residue gas via line 2. The hydrocarbon feed contains hydrogen, methane, $C_2$ to $C_5$ hydrocarbons and higher including such impurities as styrene, butadiene, isoprene, vinyl acetylene, diacetylene, pentadiene, cyclopentadiene, etc. The pretreater is filled with an adsorbent such as charcoal, silica gel, etc. and the hydrocarbon feed preferably passes upwardly therethrough at a pressure of 1 to 6 atmospheres. The temperature employed during the pretreating may vary with the nature and extent of the contaminants in the hydrocarbon gas and the nature of the adsorbent employed. Temperatures within the range of 100° F. to 500° F., preferably 120° F. to 250° F. are employed. During the passage of the gas through the pretreater the undesirable constituents are removed therefrom and the purified gas is removed via line 4 to be introduced into adsorption tower 6 for further treatment. The spent adsorbent is removed from the pretreater via line 5 and introduced into a first desorber 7. During the pretreatment step some desired hydrocarbons may also be removed by the guard adsorbent. However, these materials will be less tenaciously adsorbed than the more highly unsaturated contaminants, therefore, they may be more readily desorbed from the guard adsorbent. In the first desorber mild heating is applied to the adsorbent to desorb therefrom only the light low molecular weight materials adsorbed from the feed gas which materials are desired components of the feed to the main adsorption zone 6. The heating should be controlled so as not to desorb any of the heavier components. The light desorbed materials are withdrawn via line 8 and returned to the pretreater with the feed gas via line 2. The partially stripped adsorbent is then passed into the second desorber 9 wherein more vigorous heating is applied. Steam may be introduced into the desorber 9 via line 10 to aid in the desorption of the heavier materials. The heavier desorbed materials plus steam are removed from the system via line 11. The desorbed adsorbent passes from desorber 9 via line 12 to regenerator 13. In regenerator 13 the guard adsorbent is subjected to severe regeneration conditions such as combustion with air, steam or flue gas at a temperature of from 1200° F. to 2000° F., depending upon the identity of the adsorbent, for the removal of contaminants therefrom. These contaminants will consist of the higher unsaturated materials originally present in the hydrocarbon gas feed or their chemical reaction products, such as polymers, co-polymers and alkylation products. Air, steam or flue gas employed in the regeneration is introduced into the regenerator via line 14. The regenerated adsorbent is withdrawn via line 15 and returned to the pretreater via lines 16 and 3 after passing through cooler 17. Combustion gases are removed from the regenerator via line 18 for discard or recovery of any components thereof.

The purified hydrocarbon stream contained in line 4 and comprising at this point essentially hydrogen, methane, ethylene, ethane, propylene, propane, the butanes and butylenes, etc., is introduced into primary adsorption tower 6. Tower 6 is divided into three main sections, an adsorber section 19 above the feed point, a rectifier section 20 immediately below the feed point, and a desorber section 21 below the rectifier section. The tower is provided with an outlet 22 situated at an upper portion of the adsorber section for removal of hydrogen, methane and lighter gases such as $CO_2$, CO, $N_2$, etc. The tower is also provided with a charcoal feed line 23 for introduction of the adsorbent into the tower. Rectifier section 20 contains one or more withdrawal lines 24 and 25 for the removal of substantially pure intermediate fractions such as $C_2$ and $C_3$ hydrocarbon fractions, while the desorber section 21 contains a withdrawal line 26 for the removal of $C_4$ and higher hydrocarbon fractions. It may be pointed out that any number of withdrawal points may be provided in accordance with the number of hydrocarbon streams desired from the fractionation. Thus separate withdrawal lines may be provided below line 25 in the rectifier section for the removal of a $C_4$ fraction, a $C_5$ fraction, etc., with only the heaviest component being removed from the desorber. The desorber section contains a heating element (not shown) such as a Dowtherm heater for use in the desorption of the adsorbent. Steam entering the desorber section via line 27 assists in the stripping of the heavier hydrocarbons. The hot adsorbent free of hydrocarbon constituents is removed from tower 6 via line 28, and is introduced into cooler 29 via line 30 and after being brought to the proper temperature is returned to the tower 6 via lines 31 and 23 to repeat the adsorption cycle.

When the pretreater is functioning properly the charcoal adsorbent will require little or no regeneration since the components of the feed which normally bring about the deactivation of the charcoal will have been removed. Thus greatly increased life is imparted to the charcoal. However, if desired, a small portion of the desorbed charcoal may from time to time be withdrawn and sent to regenerator 32 via line 33. In the regenerator 32 the charcoal is subjected to comparatively mild regeneration conditions such as treatment with steam or flue gas at temperatures in the neighborhood of 600° F. to 1100° F. For this purpose steam or flue gas may be admitted to the regenerator 32 via line 34, entering at the bottom of the vessel. The spent gases are removed from the regeneration zone via line 35 and the regenerated adsorbent is returned via line 36 to line 30 for conveyance to the cooling zone 29 after which the reactivated carbon passes along with the recycled carbon to the top of the adsorption zone via lines 31 and 23.

In the adsorption tower a gas mixture consisting predominantly of $C_1$, $C_2$, and $C_3+$ hydrocarbons including olefins and paraffins is introduced into the adsorber at a point between the adsorber and the rectifier sections thereof. In the adsorber the gas contacts a bed of solid granular charcoal which is moving downwardly through the tower either as a slowly gravitating bed or as a mass of fluidized solids. The charcoal flows through the tower at such a rate that substantially all of the $C_2$ and heavier hydrocarbons are adsorbed in adsorber section 19, while methane and lighter gases pass upwardly through the adsorber section into the lean gas vent line 22. The saturated charcoal passes from the adsorber section into rectifier section 20 where an equilibrium is established between methane and any lighter materials which may have been adsorbed and the $C_2$ and heavier hydrocarbons. This equilibrium is established by means of refluxing the charcoal with $C_2$ hydrocarbons which have become disengaged from the charcoal at a lower point in the column. Thus in the top of the rectifier section any residual methane or lighter gases which may have been carried down with the carbon are displaced by the $C_2$ hydrocarbons for which the charcoal has a greater affinity. The light gases pass upwardly into the adsorber section. The charcoal which is now free of methane and the lighter components passes to the bottom of the rectifier section where it is in turn refluxed with the $C_3+$ hydrocarbon components of the gas mixture. In this manner the $C_2$ hydrocarbons are desorbed and a relatively pure stream of $C_2$ hydrocarbons can be removed via line 24. This stream is substantially free of methane and contains small equilibrium quantities of propane, propylene, the butanes, etc.

The charcoal which is now free of the lighter components and of the $C_2$ components passes downwardly into desorber section 21. In the desorber section the charcoal is heated by means of a Dowtherm heating element (not shown) and contacted with steam entering via line 27. The action of the heat and steam causes stripping of the $C_3+$ components from the charcoal and they pass up through the desorber section and are removed via line 26. If desired, the $C_3$ fraction may be removed from the lower portion of the rectifier via line 25, and the heavier $C_4+$ components may be removed from the desorber via line 26. Stripping temperatures in the neighborhood of 400° F. to 550° F. are employed. Also by employing a number of stages more than one side cut may be obtained from the desorber. For example, a $C_3$ or $C_4$ cut could be taken from a point near the top of the desorber, while a $C_4$ or $C_5$ cut could be removed from a point lower down in the section, etc. Part of the sidestream removed via lines 24, 25 and 26 may be refluxed to the rectifier and desorber zones respectively for the more complete removal of methane and $C_2$ hydrocarbons respectively.

Hot charcoal leaving the desorber at a temperature of approximately 400° F. to 550° F. is cooled to approximately 120° F. to 175° F. in cooler 29 and returned to the adsorber section of the tower via lines 31 and 23.

A marked difference exists in the conditions employed to reactivate the charcoal in regenerator 32 over those employed to reactivate the guard adsorbent in regenerator 13. It has been found that when activated charcoal has been contaminated by polymerizable constituents such as those mentioned above, regeneration at a temperature in the neighborhood of 1600° F. to 1700° F. with steam is required to restore the charcoal to its original activity or thereabouts. However, when reactivation at this temperature is attempted an extremely large quantity of charcoal is lost via the water gas reaction. For example, it has been found that by steaming a charcoal which has been deactivated by butadiene poisoning for 80 minutes at 1600° F. to 1700° F., 16.3% of the carbon is lost. At the current price of carbon this is a tremendous loss and renders the process economically prohibitive. Under no circumstances could air be employed in the reactivation as this would cause undue loss of charcoal. Attempts must therefore be made to prevent the charcoal from being subjected to the deactivation tendencies exhibited by the highly unsaturated hydrocarbons such as mentioned above. When these heavy and highly unsaturated hydrocarbons are removed from the hydrocarbon feed to the adsorption process, the charcoal life increases considerably and when reactivation is necessary the carbon can be restored to its original activity by comparatively mild reactivation conditions such as by steaming at 600° F. to 1100° F.

However, on the other hand the regeneration of the guard adsorbent is carried out under very severe conditions. This is necessary because of the nature of the materials adsorbed by the guard adsorbent and it is possible because of the nature of the guard adsorbent itself. The guard adsorbent may be one (e. g. silica gel, alumina or clay) which will withstand considerably higher temperature necessary to disengage the polymerizable materials therefrom without at the same time being consumed by reaction with the regenerating gas. In this respect air may be employed as the regenerating gas as well as steam, flue gas, etc. On the other hand one can use as the guard adsorbent a cheaper form of charcoal or a deactivated charcoal of which a certain loss may be tolerated.

It is also within the scope of this invention to employ as the adsorbent in the pretreater a portion of the spent adsorbent from the main adsorption process. In this connection a portion of the spent charcoal being furnished to regenerator 32 may be withdrawn from line 28 and led to pretreater 1 via lines 37 and 3.

The pretreater may be operated as a fixed bed, a moving bed or a fluid solids system. While the adsorption system may be a moving bed or a fluid solid process, a multiplicity of guard chambers may be used with intermittent changing of the spent adsorbent. It is also contemplated that the pretreater may be employed for the separation of any hydrocarbon gases which might contain poisons. For example, propylene may be purified of higher boiling constituents or butylenes purified of higher boiling hydrocarbon or sulfur compounds which are adsorbed more strongly than the desired hydrocarbons.

Having described the process in the manner such that it may be employed by those skilled in the art, what is claimed is:

1. A process for the separation of a gaseous mixture of $C_1$ to $C_3$ hydrocarbons containing easily polymerizable unsaturated hydrocarbon constituents which comprises passing the gaseous mixture into a first adsorption zone in contact with granular carbon obtained from a second adsorption zone whereby the easily polymerizable constituents are removed from the gaseous mixture, passing the gaseous mixture from the first adsorption zone into countercurrent contact with granular carbon passing downwardly through a second adsorption zone having an adsorption section above the gaseous mixture feed point, a middle rectification section and a lower desorption section below the gaseous mixture feed point, removing a vapor stream comprising methane from an upper portion of the adsorption section, removing $C_2$ hydrocarbons from the rectification section, removing $C_3$ hydrocarbons from the desorption section, intermittently removing a portion of the carbon from the desorption section and passing it to the first adsorption zone, and subjecting the carbon from the first adsorption zone to mild heating to desorb therefrom non-polymerizable $C_1$ to $C_3$ hydrocarbons and returning the latter to the gaseous mixture feed stream to the first adsorption zone.

2. A process according to claim 1, in which said gaseous mixture of $C_1$ to $C_3$ hydrocarbons includes olefins and paraffins and contains hydrogen, and in which the easily polymerizable constituents are polyolefin hydrocarbons comprising diolefins.

References Cited in the file of this patent

UNITED STATES PATENTS

| Number | Name | Date |
|---|---|---|
| 1,422,007 | Soddy | July 4, 1922 |
| 1,836,301 | Bechthold | Dec. 15, 1931 |
| 2,376,425 | Frey | May 22, 1945 |
| 2,378,531 | Becker | June 19, 1945 |
| 2,446,076 | Campbell et al. | July 27, 1948 |
| 2,451,804 | Campbell et al. | Oct. 19, 1948 |
| 2,519,344 | Berg | Aug. 22, 1950 |
| 2,548,192 | Berg | Apr. 10, 1951 |

FOREIGN PATENTS

| Number | Country | Date |
|---|---|---|
| 572,423 | Great Britain | Oct. 8, 1945 |

OTHER REFERENCES

"Hypersorption Process for Separation of Light Gases," Clyde Berg, A. I. Ch. E. Transactions, vol. 42, #4, August 25, 1946, pages 665 to 680.